United States Patent
Nomura

(10) Patent No.: US 10,477,106 B2
(45) Date of Patent: Nov. 12, 2019

(54) CONTROL SYSTEM, IMAGING DEVICE, AND COMPUTER-READABLE MEDIUM

(71) Applicant: RICOH COMPANY, Ltd., Ohta-Ku (JP)

(72) Inventor: Kenichiroh Nomura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/911,423

(22) Filed: Mar. 5, 2018

(65) Prior Publication Data

US 2018/0191956 A1 Jul. 5, 2018

Related U.S. Application Data

(63) Continuation of application No. PCT/JP2016/071433, filed on Jul. 21, 2016.

(30) Foreign Application Priority Data

Sep. 9, 2015 (JP) .................... 2015-177618

(51) Int. Cl.
*H04N 5/232* (2006.01)
*H04N 5/235* (2006.01)
(Continued)

(52) U.S. Cl.
CPC ......... *H04N 5/23238* (2013.01); *G02B 13/06* (2013.01); *G03B 7/091* (2013.01);
(Continued)

(58) Field of Classification Search
CPC ...... G03B 37/00; G02B 13/06; H04N 5/2351; H04N 5/23238
See application file for complete search history.

(56) References Cited

U.S. PATENT DOCUMENTS 5,903,303 A 5/1999 Fukushima et al.
9,538,160 B1 * 1/2017 Cole .................... H04N 13/243
(Continued)

FOREIGN PATENT DOCUMENTS

JP 02-288560 11/1990
JP 3778114 3/2006
(Continued)

OTHER PUBLICATIONS

Extended European Search Report dated Aug. 10, 2018 in corresponding European Patent Application No. 16844054.3 citing documents AA, AB and AO therein, 7 pages.
(Continued)

*Primary Examiner* — Ahmed A Berhan
(74) *Attorney, Agent, or Firm* — Xsensus LLP

(57) ABSTRACT

A control system controls an imaging device to generate an omnidirectional image based on a first image obtained using a first fisheye lens and a second image obtained using a second fisheye lens. The control system includes an evaluation value calculating unit configured to: calculate brightness values of the first and second images based on pixel values of pixels constituting the first and second images, and calculate, based on the brightness values, first and second exposure evaluation values for evaluating exposure of first and second imaging elements corresponding to the first and second fisheye lenses. The evaluation value calculating unit configured to do not use pixel values of pixels constituting an overlapping area in which there is overlapping of shooting ranges of the first and second images, during calculation of the brightness values of the first and second images.

8 Claims, 9 Drawing Sheets

(51) Int. Cl.
  *H04N 5/225* (2006.01)
  *G02B 13/06* (2006.01)
  *G03B 7/091* (2006.01)
  *H04N 5/238* (2006.01)
  *G03B 37/00* (2006.01)
  *G03B 15/00* (2006.01)
  *G03B 19/07* (2006.01)

(52) U.S. Cl.
  CPC ............ *G03B 15/00* (2013.01); *G03B 19/07* (2013.01); *G03B 37/00* (2013.01); *H04N 5/225* (2013.01); *H04N 5/2253* (2013.01); *H04N 5/2254* (2013.01); *H04N 5/235* (2013.01); *H04N 5/238* (2013.01); *H04N 5/2351* (2013.01); *H04N 5/2353* (2013.01); *H04N 5/2258* (2013.01)

(56) References Cited

U.S. PATENT DOCUMENTS

| | | |
|---|---|---|
| 2003/0184661 A1 | 10/2003 | Yubata et al. |
| 2010/0208099 A1 | 8/2010 | Nomura |
| 2010/0231746 A1 | 9/2010 | Nomura |
| 2011/0050950 A1 | 3/2011 | Nomura |
| 2011/0199508 A1 | 8/2011 | Nomura |
| 2014/0078247 A1* | 3/2014 | Shohara ................ H04N 9/735 348/38 |
| 2014/0118341 A1* | 5/2014 | Shimizu ................ G06T 3/4038 345/419 |
| 2015/0222816 A1 | 8/2015 | Shohara et al. |
| 2016/0269607 A1 | 9/2016 | Nomura |

FOREIGN PATENT DOCUMENTS

| | | |
|---|---|---|
| JP | 2007-053617 | 3/2007 |
| JP | 2014-057156 | 3/2014 |
| JP | 2014-123797 | 7/2014 |
| JP | 2015-050498 | 3/2015 |
| JP | 5843027 | 11/2015 |
| WO | WO 2014/042104 A1 | 3/2014 |

OTHER PUBLICATIONS

International Search Report dated Sep. 6, 2016 in PCT/JP2016/071433 filed on Jul. 21, 2016 (with English translation).

Written Opinion dated Sep. 6, 2016 in PCT/JP2016/071433 filed on Jul. 21, 2016.

\* cited by examiner

| AE EVALUATION VALUE | ΔE$_V$ |
|---|---|
| 3680 | +3 |
| 1840 | +2 |
| 920 | +1 |
| 460 | ±0 |
| 230 | −1 |
| 115 | −2 |
| 58 | −3 |

| INPUT | OUTPUT | |
|---|---|---|
| $T_V$ | POST-CORRECTION $T_V$ | $S_V$ CORRECTION VALUE |
| 0xBF | 0xC0 | +1 |
| 0xBE | 0xC0 | +2 |
| 0xBD | 0xC0 | +3 |
| 0xB6 | 0xB7 | +1 |
| 0xB5 | 0xB7 | +2 | ions # CONTROL SYSTEM, IMAGING DEVICE, AND COMPUTER-READABLE MEDIUM

CROSS-REFERENCE TO RELATED APPLICATIONS

The present application is a continuation application of International Application No. PCT/JP2016/071433, filed Jul. 21, 2016, which claims priority to Japanese Patent Application No. 2015-177618, filed Sep. 9, 2015. The contents of these applications are incorporated herein by reference in their entirety.

BACKGROUND OF THE INVENTION

1. Field of the Invention

The present invention relates to a control system that controls an imaging device; relates to an imaging device that includes the control system; and relates to a computer-readable medium.

2. Description of the Related Art

A camera that represents an imaging device includes an imaging element such as a CMOS (Complementary Metal Oxide Semiconductor) image sensor and converts light, which has been input by the imaging element, into an image signal. Then, based on a brightness value obtained from the image signal, the camera calculates an exposure value at which the correct exposure is achieved; and adjusts setting values, such as the shutter speed and the aperture value, according to the exposure value and based on a program chart. Usually, a camera is equipped with an automatic exposure control function (AE) for automatically performing such adjustment.

Herein, the brightness value represents the degree of brightness of an image; the exposure implies exposing the imaging element to light; and the correct exposure implies the exposure at which an image is expressed using natural brightness and natural colors when viewed by a person. The exposure value represents the degree of exposure of the imaging element to light; and the shutter speed represents the period of time (an exposure period) for which the imaging element is exposed to light or for which an openable-closable shutter that is meant to block the light is opened so as to expose the imaging element to light. The aperture value represents the brightness of the image appearing on the imaging element, and is also called an F-ratio. The program chart is a correspondence table in which exposure values are held in a corresponding manner to shutter speeds and aperture values.

In the AE control, when the brightness of the photographic subject goes up, control is performed to increase the shutter speed and reduce the aperture. There are some cameras in which the aperture mechanism is not installed so as to make the cameras available at low cost. In such a case, the exposure control is performed by varying the shutter speed (for example, Japanese Patent Application Laid-open No. 2-288560 and Japanese Patent No. 3778114).

For example, in the case of taking a video, since it is important to have a continuous link, the exposure control needs to be minutely performed so as to ensure that there is no feeling of strangeness due to the difference in exposure among the frames. Generally, regarding the shutter speed resolution of a CMOS image sensor, more the shutter speed moves toward the high-speed side, the coarser becomes the shutter speed resolution. However, in the conventional technology, in an environment of high brightness of the photographic subject, the shutter speed cannot be controlled to match the exposure and thus the exposure control cannot be performed with accuracy.

Moreover, in an imaging device that includes a plurality of imaging elements corresponding to a plurality of lens optical systems, automatic control of exposure and white balance is performed based on the brightness values obtained from the plurality of imaging sensors. However, in this method, as in the case of an omnidirectional imaging camera that takes images in all directions using a pair of fisheye lenses, when the shooting ranges of images obtained from two imaging sensors include an overlapping area, the inventor discovered that a stable control is not carried out.

SUMMARY OF THE INVENTION

According to one aspect of the present invention, a control system controls an imaging device to generate an omnidirectional image based on a first image obtained using a first fisheye lens and a second image obtained using a second fisheye lens. The control system includes an evaluation value calculating unit configured to: calculate a brightness value of the first image based on pixel values of pixels constituting the first image, calculate, based on the brightness value, a first exposure evaluation value for evaluating exposure of a first imaging element corresponding to the first fisheye lens, calculate a brightness value of the second image based on pixel values of pixels constituting the second image, and calculate, based on the brightness value, a second exposure evaluation value for evaluating exposure of a second imaging element corresponding to the second fisheye lens. The evaluation value calculating unit configured to do not use pixel values of pixels constituting an overlapping area in which there is overlapping of a shooting range of the first image and a shooting range of the second image, during calculation of the brightness value of the first image and calculation of the brightness value of the second image.

DETAILED DESCRIPTION OF THE PREFERRED EMBODIMENTS

Figure 1A:
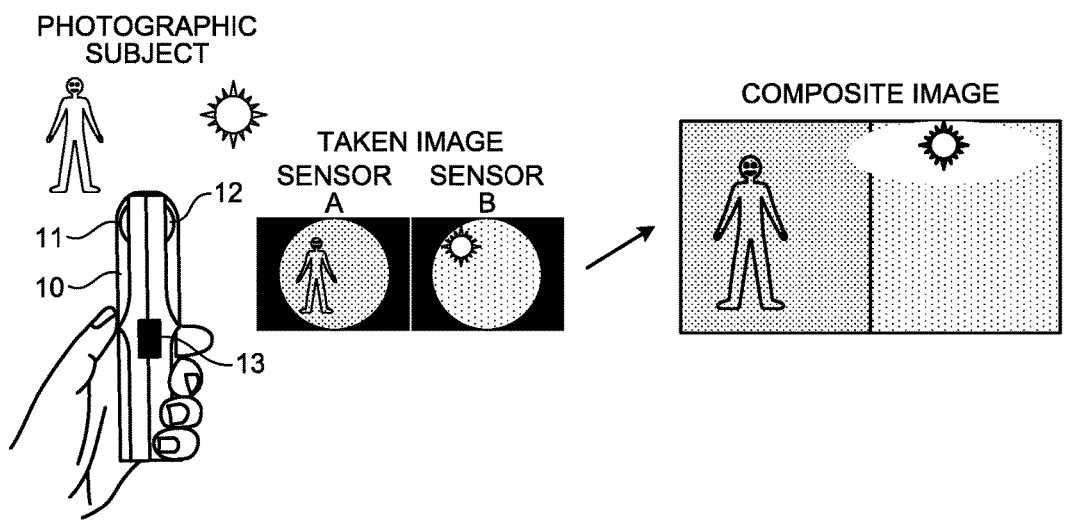
FIG. 1A is a diagram illustrating an external view of an imaging device, and illustrating an image obtained by the imaging device.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide a system, a device, a method, and the like that enable performing exposure control with accuracy.

FIG. 1A is a diagram illustrating an external view of an imaging device 10 according to an embodiment of the present invention, and illustrating an image obtained by the imaging device 10. As illustrated in FIG. 1A, the imaging device 10 includes a pair of lens windows 11 and 12 placed opposite to each other, and is capable of taking images in all directions from the imaging position. In the following explanation, the imaging device 10 is referred to as an omnidirectional imaging camera 10.

Figure 1B:
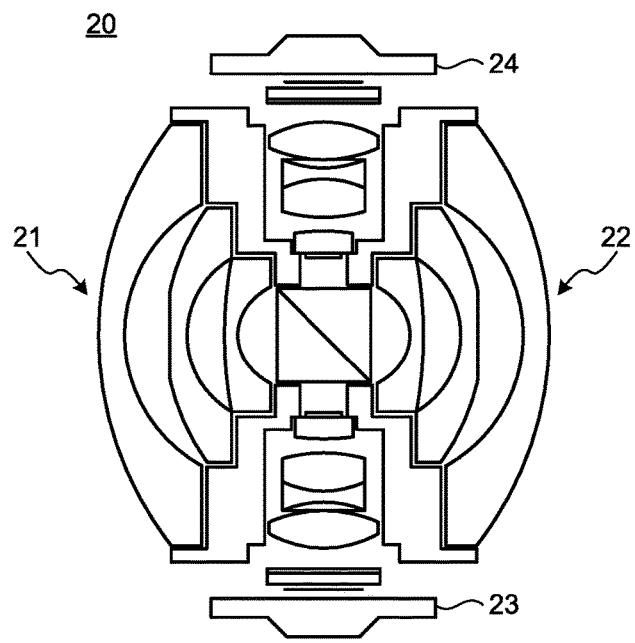
FIG. 1B is a diagram that schematically illustrates a structure inside a camera cone unit that is installed in an omnidirectional imaging camera.

FIG. 1B is a diagram that schematically illustrates a structure inside a camera cone unit 20 that is installed in the omnidirectional imaging camera 10. As illustrated in FIG. 1B, the camera cone unit 20 includes a first imaging optical system made of an image forming optical system 21 and a corresponding imaging element 23, and includes a second imaging optical system made of an image forming optical system 22 and a corresponding imaging element 24. The image forming optical systems 21 and 22 are configured using, for example, seven fisheye lens elements in six groups.

The positions of the optical elements (a lens optical system, a prism, a filter, and an aperture stop) in the two image forming optical systems 21 and 22 as well as the positions of the imaging elements 23 and 24 are decided in such a way that the optical axes of the image forming optical systems 21 and 22 are orthogonal to the central portion of the light receiving areas of the corresponding imaging elements 23 and 24, respectively, and in such a way that the light receiving areas serve as imaging planes for the corresponding fisheye lenses. Herein, a pair of fisheye lenses, which constitute the lens optical system of each of the image forming optical systems 21 and 22, have the respective optical axes set to be coincident and are placed in mutually opposite directions.

The imaging elements 23 and 24 are two-dimensional solid-state image sensing devices in which the light receiving area serves as the dimension; and convert the light that is collected by the corresponding image forming optical systems 21 and 22, respectively, into image data and output images to a processor (not illustrated). The processor pieces the partial images input from the imaging elements 23 and 24 and performs image synthesis, and generates images having the solid angle of $4\pi$ radian (hereinafter, called "omnidirectional images").

In the omnidirectional imaging camera 10, of the pair of image forming optical systems 21 and 22, a first image taken by one image forming optical system is mapped on the upper half-sphere side of the omnidirectional format, a second image taken by the other image forming optical system is mapped on the lower half-sphere side of the omnidirectional format, and then the two images are pieced to generate an omnidirectional image. At that time, in order to detect the joining position of the first image and the second image, it becomes necessary to have areas in which the shooting ranges overlap between the images (hereinafter, called overlapping areas). For that reason, the fisheye lenses constituting each of the image forming optical systems 21 and 22 have the total angle of view exceeding 180° (=360°/n; n=2). Preferably, the fisheye lenses have the angle of view of 185° or more. More preferably, the fisheye lenses have the angle of view of 190° or more. Meanwhile, in the following explanation, the image forming optical systems 21 and 22 are simply referred to as fisheye lenses 21 and 22, respectively.

When the photographer presses an imaging SW 13, the two imaging elements ae concurrently exposed to light with the pressing of the imaging SW 13 serving as the trigger, and images are taken. The two imaging elements convert the received light into electrical signals and obtain images. The obtained images are obtained using the fisheye lenses 21 and 22, and hence are called fisheye images. In the subsequent image processing, the two fisheye images obtained by the two imaging elements are subjected to image conversion and the overlapping areas are coupled, so that an omnidirectional image is generated.

The omnidirectional imaging camera 10 stores the data of the generated omnidirectional image and, in response to a user request, can output the data to an output device (not illustrated), such as a PC having a display unit, and can display the data on that display unit. Moreover, the omnidirectional imaging camera 10 can output the data of the generated omnidirectional image to an output device such as a printer (not illustrated) or an MFP (Multi Function Peripheral) (not illustrated) for printing purposes. Alternatively, the omnidirectional imaging camera 10 can output the data of the generated omnidirectional image to an output device such as an MFP or a printer, and can also send it over FAX or using an email.

In FIG. 1, two fisheye images are also illustrated that represent the taken images obtained by imaging by the omnidirectional imaging camera 10. The fisheye images are obtained by imaging by sensors A and B (see FIG. 3). In the fisheye image obtained by imaging by the sensor B, a white blurred image called flare is formed, thereby leading to different brightness in the two fisheye images. The two fisheye images are joined based on images of appropriate objects present in the boundary portion of the fisheye images, and a composite image is generated.

Depending on an image, there are times when the flare spreads across the entire imaging element centered on the high-intensity object or there are times when images of appropriate objects are not present in the boundary portion. In such cases too, image correction and image processing can be performed according to a known method, and a composite image can be generated. Since the known method has no direct relation with the present invention, its explanation is not given herein.

Figure 2:
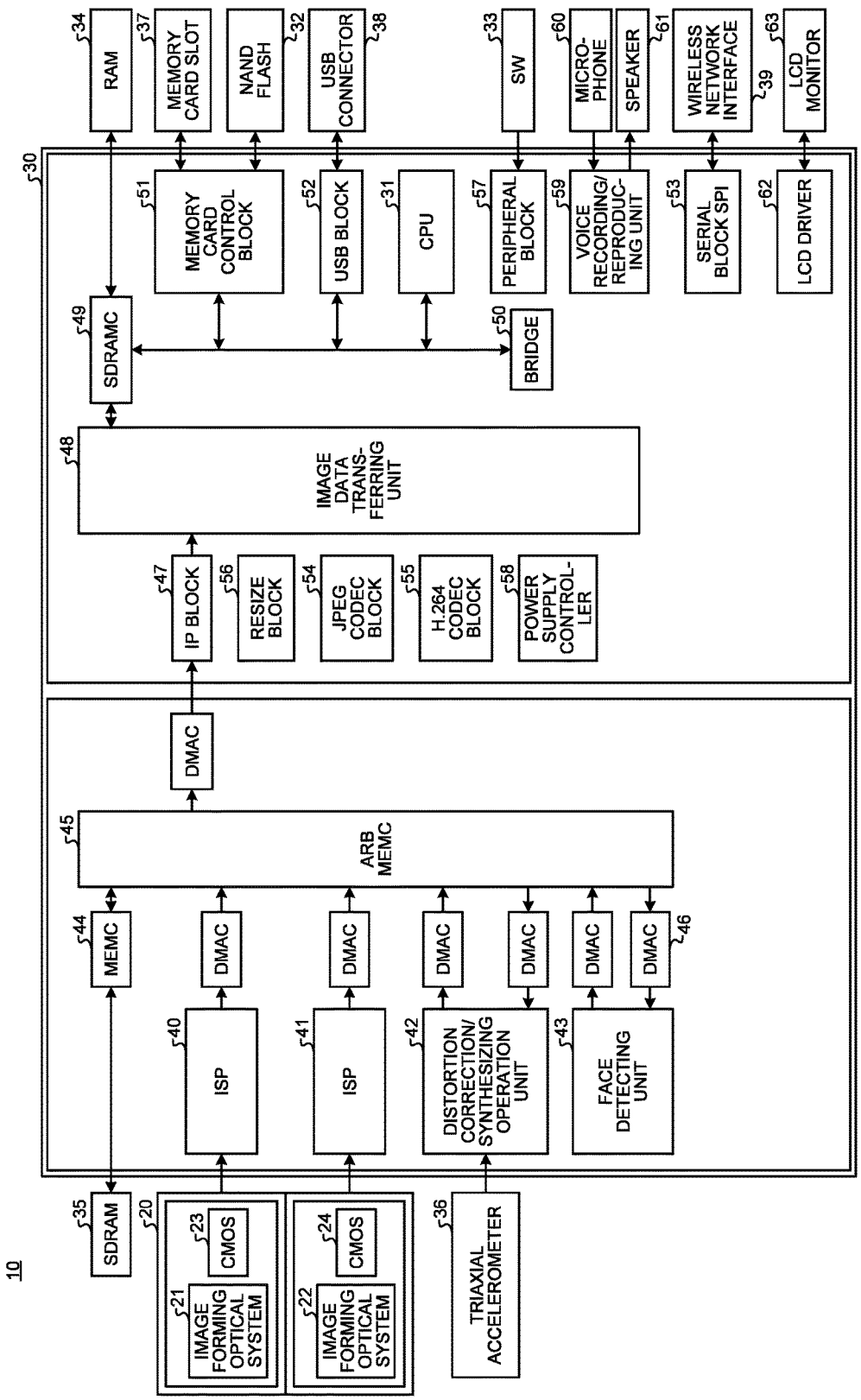
FIG. 2 is a diagram illustrating a hardware configuration of the imaging device.

FIG. 2 is a diagram illustrating a hardware configuration of the omnidirectional imaging camera 10. The omnidirectional imaging camera 10 includes the camera cone unit 20 that further includes the image forming optical systems 21 and 22 and the imaging elements 23 and 24. The image forming optical systems 21 and 22 collect light coming from the photographic subject and make the light fall on the imaging elements 23 and 23, respectively. The imaging elements 23 and 24 convert the incident light into electrical signals. The imaging elements 23 and 24 are controlled according to control commands issued by a CPU 31 of a processor 30 (described later) that is installed in the camera main body. With reference to FIG. 2, CMOS is used as the imaging elements 23 and 24.

A NAND FLASH 32 that serves as a ROM is used to store a program which is written using a code readable by the CPU 31 and to store setting values to be used in performing control. An SW 33 is a power switch for turning ON the power supply of the omnidirectional imaging camera 10. When the power supply is turned ON, the CPU 31 reads the program into a main memory and executes it. The CPU 31 executes the program so as to control the internal operations of the camera; and temporarily stores data, which is required in performing control, in a RAM 34 and a local SRAM (not illustrated) in the processor 30. Herein, it is desirable that a rewritable flash ROM used as the ROM so as to enable making modifications in the program and the setting values and to enable easy upgradation of the functions.

The processor 30 includes image signal processors (ISPs) 40 and 41, which perform white balance processing and gamma correction with respect to the image data output from the imaging elements 23 and 24. The white balance processing is processing for applying a gain for the purpose of expressing the white portion as white color depending on the type of the light source such as the natural sunlight or a fluorescent light. In the gamma correction, the characteristics of the output device are taken into account and correction is accordingly performed with respect to input signals so as to maintain the linearity of the output. Moreover, the ISPs 40 and 41 perform filtering with respect to the image data to extract brightness values and color difference values, and perform conversion to brightness data representing brightness information and to color difference data representing color difference information. Meanwhile, the color difference is obtained by quantifying the difference between two colors.

The omnidirectional imaging camera 10 includes an SDRAM 35 and a triaxial accelerometer 36. The SDRAM 35 is used to temporarily store the image data before the operations by the ISPs 40 and 41 and before distortion correction (described later) and a synthesizing operation. The triaxial accelerometer 36 measures the acceleration of the omnidirectional imaging camera 10. The measured acceleration is used in deciding the inclination and the vertical direction of the camera.

The processor 30 includes a distortion correction/synthesizing operation unit 42. In the synthesizing operation, two sets of image data that are output from the imaging elements 23 and 24 and that are processed by the ISPs 40 and 41 are synthesized to generate composite image data. Then, the distortion correction/synthesizing operation unit 42 makes use of information from the triaxial accelerometer 36, performs distortion correction and vertical correction in a concurrent manner, and generates a composite image in which the inclination is corrected. In the distortion correction, for example, a conversion table is used and fisheye images are converted into two-dimensional planar images.

The processor 30 includes a face detecting unit 43 that performs face detection with respect to a composite image in which the inclination has been corrected, and identifies the positions of faces. The identified positions of faces are used for achieving the focus at the time of imaging. The SDRAM 35 is connected to an ARB MEMC 45 via a MEMC 44, and the triaxial accelerometer 36 is directly connected to the distortion correction/synthesizing operation unit 42. The MEMC 44 is a controller that controls reading of the image data from the SDRAM 35 and writing of data in the SDRAM 35. The ARB MEMC 45 is a controller that mediates the communication of the image data.

In between the ISPs 40 and 41 and the ARB MEMC 45, in between the distortion correction/synthesizing operation unit 42 and the ARB MEMC 45, and in between the face detecting unit 43 and the ARB MEMC 45; DMACs 46 are installed so that the image data can be transferred directly without involving the CPU 31. The ARB MEMC 45 sends the image data to an image data transferring unit 48 via an imaging processing (IP) block 47. The IP block 47 performs a variety of image processing with respect to the image data. The image data transferring unit 48 is connected to an SDRAMC 49 that controls reading of data from the RAM 34 and writing of data in the RAM 34. The SDRAMC 49 is connected to a bridge 50, a memory card control block 51, a USB block 52, and the CPU 31.

The memory card control block 51 is connected to a memory card slot 37, in which a memory card is inserted for recording image data and which reads data from and writes data in the memory card; and is connected to the NAND FLASH 32. The memory card control block 51 controls the reading of data from and writing of data in the memory card and the NAND FLASH 32. The USB block 52 is connected to an external device such as a PC via a USB connector 38, and performs USB communication with the external device. To the processor 30, an embedded memory is connected so that, even when a memory card is not inserted in the memory card slot 37, the image data of the images obtained by imaging can be stored in the embedded memory.

The processor 30 includes a serial block SPI 53, a JPEGCODEC block 54, an H.264 codec block 55, and a RESIZE block 56. The serial block SPI 53 performs serial communication with an external device such as a PC via a wireless network interface 39 such as Wi-Fi. The JPEGCODEC block 54 is a codec block for performing JPEG compression/expansion. The H.264 codec block 55 is a codec block for performing compression/expansion of H.264 videos. The RESIZE block 56 is a block for scaling the image size of image data using interpolation.

The processor 30 includes a peripheral block 57 that receives ON/OFF commands from the SW 33 and accordingly turns ON or turns OFF the power supply of the omnidirectional imaging camera 10; and includes a power supply controller 58 that controls the supply of power to the components. Moreover, the processor 30 includes a voice recording/reproducing unit 59 that records voice and reproduces the recorded voice. To the voice recording/reproducing unit 59 are connected a microphone 60 that is used by the user to input voice signals, and a speaker 61 that outputs the recorded voice signals. The voice recording/reproducing unit 59 includes a microphone amplifier that amplifies the voice signals input using the microphone 60, and includes a voice recording circuit that records the amplified voice signals. Furthermore, the voice recording/reproducing unit 59 includes a voice reproduction circuit that converts the recorded voice signals into signals which can be output from the speaker 61, and includes an audio amplifier that amplifies the post-conversion voice signals and drives the speaker 61. The voice recording/reproducing unit 59 performs operations under the control of the CPU 31.

Meanwhile, the image data that is stored in the SDRAM 35 or in the embedded memory (not illustrated) can be RAW-RGB image data which has been subjected to white balance setting and gamma setting by the ISPs 40 and 41, or can be YUV image data which has been subjected to filtering. Moreover, the image data can be JPEG image data which has been subjected to JPEG compression by the JPEGCODEC block 54.

The processor 30 further includes a drive circuit called an LCD driver 62 for driving an LCD monitor 63. The LCD driver 62 converts commands from the CPU 31 into signals for displaying the image data and the current status on the LCD monitor 63.

Figure 3:
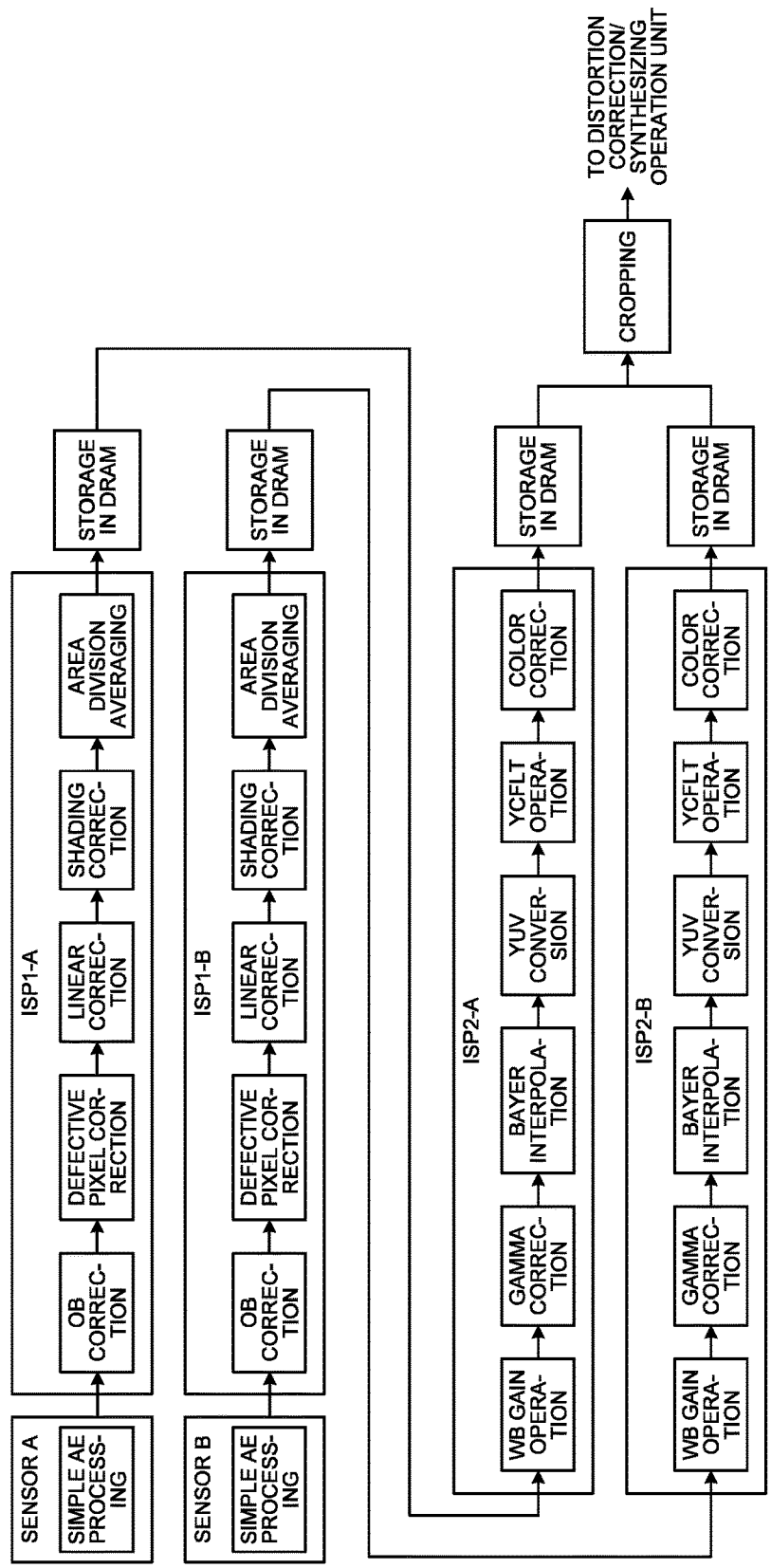
FIG. 3 is a flow diagram illustrating a flow of operations performed in the imaging device illustrated in FIG. 2.

FIG. 3 is a flow diagram illustrating a flow of operations performed in the omnidirectional imaging camera 10 illustrated in FIG. 2. In the following explanation, the imaging element 23 is referred to as the sensor A; the imaging element 24 is referred to as the sensor B; the ISPs 40 that are connected to the sensor A are referred to as ISP1-A and ISP2-A; and the ISPs 41 that are connected to the sensor B are referred to as ISP1-B and ISP2-B. The image data output from the sensor A is input to the ISP ISP1-A, and the image data output from the sensor B is input to the ISP ISP1-B. In the ISPs ISP1-A and ISP1-B; OB correction, defective pixel correction, linear correction, shading correction, and area division averaging is performed.

The OB correction implies optical black correction in which the output signal of an optical black area is obtained as the reference level, and the output signal of the effective pixel area in the image data is corrected.

The sensors A and B have a number of pixels arranged therein, and are manufactured by forming a number of photoconductive elements such as photodiodes on a semiconductor substrate. During the manufacturing, there is a possibility that defective pixels, whose pixel values cannot be fetched, get locally generated due to factors such as impurity getting mixed in the semiconductor substrate. In order to assign appropriate pixel values to such defective pixels, defective pixel correction is performed in which the pixel value of a defective signal is corrected based on a synthesized signal that is formed of a plurality of pixels adjacent to that defective pixel.

In the linear correction, the image data that has been subjected to defective pixel correction is converted into image data having linearity. The linear correction is performed for each of RGB colors.

On the surface of the sensors A and B, there occurs unevenness in the brightness due to the characteristics of the optical system or the imaging system. In the shading correction, a predetermined correction coefficient is multiplied to the output signals of the effective pixel area, and the distortion in the effective pixel area is corrected so as to ensure that the image has a uniform brightness against the unevenness in brightness. In the shading correction, a different correction coefficient can be multiplied for each of RGB colors, and sensitivity correction can be performed for each area.

In the area division averaging, the effective pixel area is divided into blocks of a predetermined size. These blocks are used in calculating the average brightness during an AE operation (described later) and an AWB operation (described later).

The image data that has been subjected to such processing is stored in a DRAM. Meanwhile, each of the sensors A and B independently has a simple AE processing function, and can be independently set to the correct exposure. When the variation in the exposure condition becomes smaller thereby making the exposure condition stable in each of the sensors A and B, in order to ensure that the image boundary portion of the images for both eyes have the same brightness, an area integration value (described later) that is obtained as a result of area division averaging is used, and each of the sensors A and B is set to the correct exposure.

When the operations of the ISPs ISP1-A and ISP1-B are over, the operations by the ISPs ISP2-A and ISP2-B are performed. In the ISPs ISP2-A and ISP2-B; a WB gain operation, gamma correction, Bayer interpolation, YUV conversion, an YCFLT operation, and color correction are performed, and the result is stored in a DRAM.

On a CMOS photodiode that accumulates the amount of light coming from the photographic subject, a color filter of either one of red (R), green (G), and blue (B) colors is applied for each pixel. Since the amount of transmitting light varies depending on the filter color, the charge amount accumulated in the photodiode also differs. The green color has the highest sensitivity, and the red and blue colors have approximately half of that sensitivity. Thus, in the WB gain operation (the white balance operation), in order to make the white color in the taken image look white, an operation for applying a gain to the red and blue colors is performed. Meanwhile, since the color of an object changes depending on the type of the light source (the natural sunlight or a fluorescent light), a function for varying and controlling the gain is provided so that the white color is made to look white even if the type of the light source changes.

In the output device such as a display, the relationship between input signals input to the output device and output signals output for display purposes is expressed as a nonlinear curved line, and there is a device that performs linear input-output conversion. In the case of such nonlinear output, the brightness has no tone and the image becomes dark. Hence, a person can no more view the image correctly. In that regard, in the gamma correction operation, the characteristics of the output device are taken into account, and input signals are processed in advance in such a way that linearity is maintained in the output.

In an arrangement called Bayer arrangement of the CMOS, a single pixel has either one of RGB color filters applied thereto and, in the RAW data that is output, a single pixel holds information about only a single color. In order to use the RAW data for viewing images, a single pixel needs to hold information about all three RGB colors. In the Bayer interpolation operation, in order to obtain the information about the two missing colors, interpolation is performed from the surrounding pixels.

The RAW data has the RGB data format including all RGB colors. In the YUV conversion operation, the image data having the RGB data format is converted into the YUV data format having the color space made of brightness (Y) and color difference (UV).

The YCFLT operation is an edge reinforcement operation in which the edge portions are extracted from the brightness signal of an image; a gain is applied to the extracted edges; and the noise in the image is concurrently removed using a low-pass filter (LPF). Then, in the edge reinforcement operation, the data of the post-gain-application edges is added to the post-LPF-processing image data.

The color correction operation is meant for performing chromatic value setting, hue setting, partial hue modification setting, color suppression setting, etc. The chromatic value setting is processing for setting parameters used in deciding the color strength, and represents the UV color space.

The image data stored in a DRAM is subjected to cropping in which the central area of an image is clipped and a thumbnail image is generated. The clipped image is called a regular image, and the regular image data is sent to the distortion correction/synthesizing operation unit 42 illustrated in FIG. 2. Then, based on the information received from the triaxial accelerometer 36, the distortion correction/synthesizing operation unit 42 performs vertical correction representing inclination correction. Subsequently, the JPEG-CODEC block 54 performs JPEG compression using the compression coefficient of 0.16, for example. The compressed data is stored in a DRAM, and is tagged.

Moreover, the compressed data is stored in a memory card, which is inserted in the memory card slot 37, via the memory card control block 51. In the case of transferring the compressed data to a communication terminal such as a smartphone, the data can be transferred by wireless transmission using a wireless LAN such as Wi-Fi, or using Bluetooth (registered trademark), or using infrared communication via the serial block SPI 53 and the wireless network interface 39.

Till now, the brief explanation was given about the configuration of the omnidirectional imaging camera 10 and the operations performed inside it. In a conventional camera, as explained earlier, it is not possible to control the shutter speed and minutely perform the exposure control. Hence, while taking a video, there is a feeling of strangeness due to the difference in exposure among the frames, and the resultant video does not have a continuous link. In order to resolve that issue, in the omnidirectional imaging camera 10, a control system is disposed that includes function units as illustrated in FIG. 4.

Figure 4:
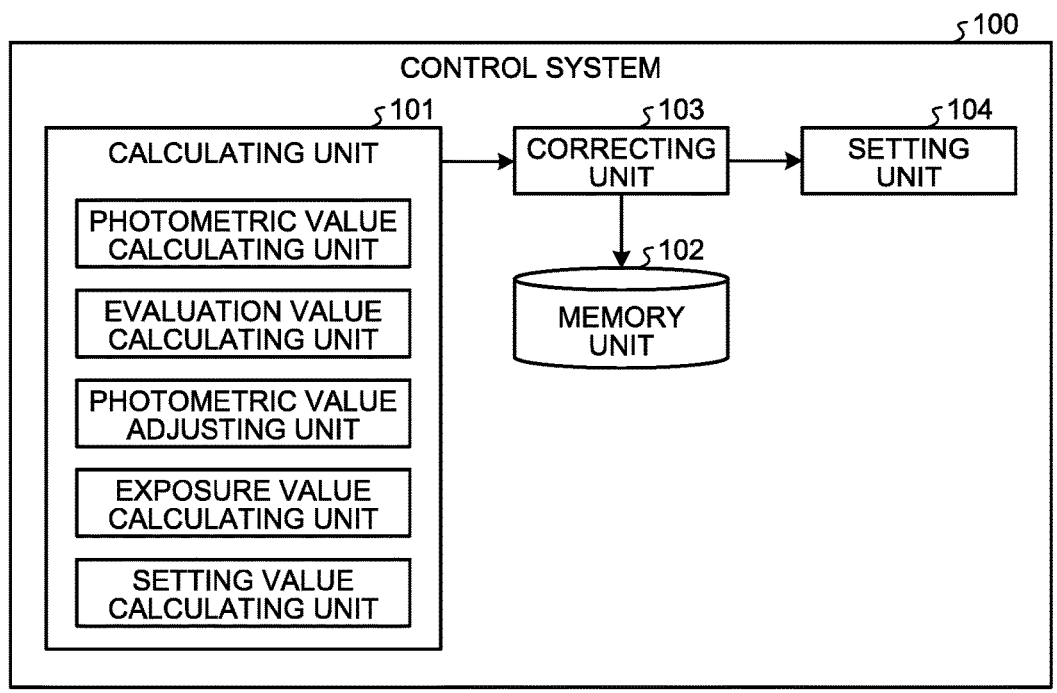
FIG. 4 is a functional block diagram illustrating a control system mounted in the imaging device.

FIG. 4 is a functional block diagram illustrating the control system implemented in the omnidirectional imaging camera 10. Herein, although the control system is assumed to be implemented in the omnidirectional imaging camera 10, it can be alternatively implemented in a separate external device of the omnidirectional imaging camera 10 or in a server device connected to a network. The function units included in the control system are implemented as a result of execution of a program by the CPU 31. In the following explanation, the omnidirectional imaging camera 10 is simply referred to as the camera.

A control system 100 includes a calculating unit 101, a memory unit 102, a correcting unit 103, and a setting unit 104 as function units. The camera includes an imaging element that collects light coming from the photographic subject and convert the light into electrical signals to obtain an image of the photographic subject. Herein, during the pre-imaging monitoring, the camera continuously obtains images of the photographic subject at a constant frame rate. The calculating unit 101 obtains, from the camera, setting values that are set regarding the control and the operations of the camera and that are meant for controlling the camera; and calculates a photometric value indicating the brightness of the photographic subject. The calculated photometric value is treated as a photographic subject brightness value. In order to calculate the photometric value, the calculating unit 101 includes a photometric value calculating unit.

Then, the calculating unit 101 calculates, from the calculated photometric value, an exposure value indicating the degree of exposure of the imaging element to light. Hence, the calculating unit 101 also includes an exposure value calculating unit for calculating the exposure value. According to a program chart described later, the exposure value is associated with the shutter speed, which indicates the exposure period for which the imaging element is to be exposed to light, and the ISO sensitivity, which is a sensitivity value indicating the sensitivity of the imaging element with respect to light, that are meant for achieving the correct exposure. Thus, as a result of using the program chart, the shutter speed and the ISO sensitivity, which are meant for achieving the correct exposure, can be obtained according to the exposure value. Thus, from the calculated exposure value, the calculating unit 101 calculates the shutter speed and the ISO sensitivity as the setting values mentioned above. For that reason, the calculating unit 101 also includes a setting value calculating unit for calculating the setting values.

Moreover, the calculating unit 101 also includes an evaluation value calculating unit for calculating an AE evaluation value and AWB evaluation values of the imaging element; and also includes a photometric value adjusting unit for adjusting the photometric value, which is calculated by the photometric calculating unit, based on the AE evaluation value of the imaging element. Regarding the details of the AE evaluation value and the AWB evaluation values, the explanation is given later.

Herein, the camera does not have an aperture for adjusting the brightness of the image appearing on the imaging element through the lens. Hence, the calculating unit 101 can calculate the shutter speed and the ISO sensitivity. However, in the case of using a camera having an aperture, the calculating unit 101 can also calculate the aperture value (the F-ratio) indicating the degree of adjustment of the brightness.

Meanwhile, if the aperture value is large, the amount of light passing through the lens becomes smaller. If the shutter speed is high, the period of exposure becomes shorter. That enables capturing a moving photographic subject without any shaking. If the ISO sensitivity is enhanced, then the electrical signals converted by the imaging element are amplified, and the image can be made brighter. Thus, if the aperture value is kept constant and if the ISO sensitivity is doubled, then the image becomes brighter. If the shutter speed is doubled and if the exposure period is shortened, then the adjustment can be done to achieve the correct exposure.

The memory unit 102 is used to store predetermined shutter speeds, and to store correction information to be used in correcting the ISO sensitivity corresponding to the predetermined shutter speeds. Regarding the details of the correction information, the explanation is given later. The correcting unit 103 determines whether the shutter speed calculated by the calculating unit 101 matches with any one of the shutter speeds specified by the correction information that is stored in the memory unit 102. If there is a match, then the correcting unit 103 corrects the shutter speed, which is calculated by the calculating unit 101, and the ISO sensitivity based on the correction information stored in the memory unit 102.

The setting unit 104 sets, as the setting values in the camera, the shutter speed and the ISO sensitivity corrected by the correcting unit 103; and performs exposure control of the camera. The camera adjusts to the post-correction shutter speed and the post-correction ISO that have been set, and takes images of the photographic subject.

Regarding the shutter speed resolution of a CMOS image sensor, more the shutter speed moves toward the high-speed side, the coarser becomes the shutter speed resolution as mentioned earlier. For that reason, in the conventional control, in an environment of high brightness of the photographic subject, it is not possible to achieve the correct exposure by controlling the shutter speed. However, if the shutter speed and the ISO sensitivity are corrected and then set as setting values in the camera as explained above, then it becomes possible to perform minute exposure control. Hence, even in an environment of high brightness of the photographic subject, the correct exposure can be achieved.

Figure 5:
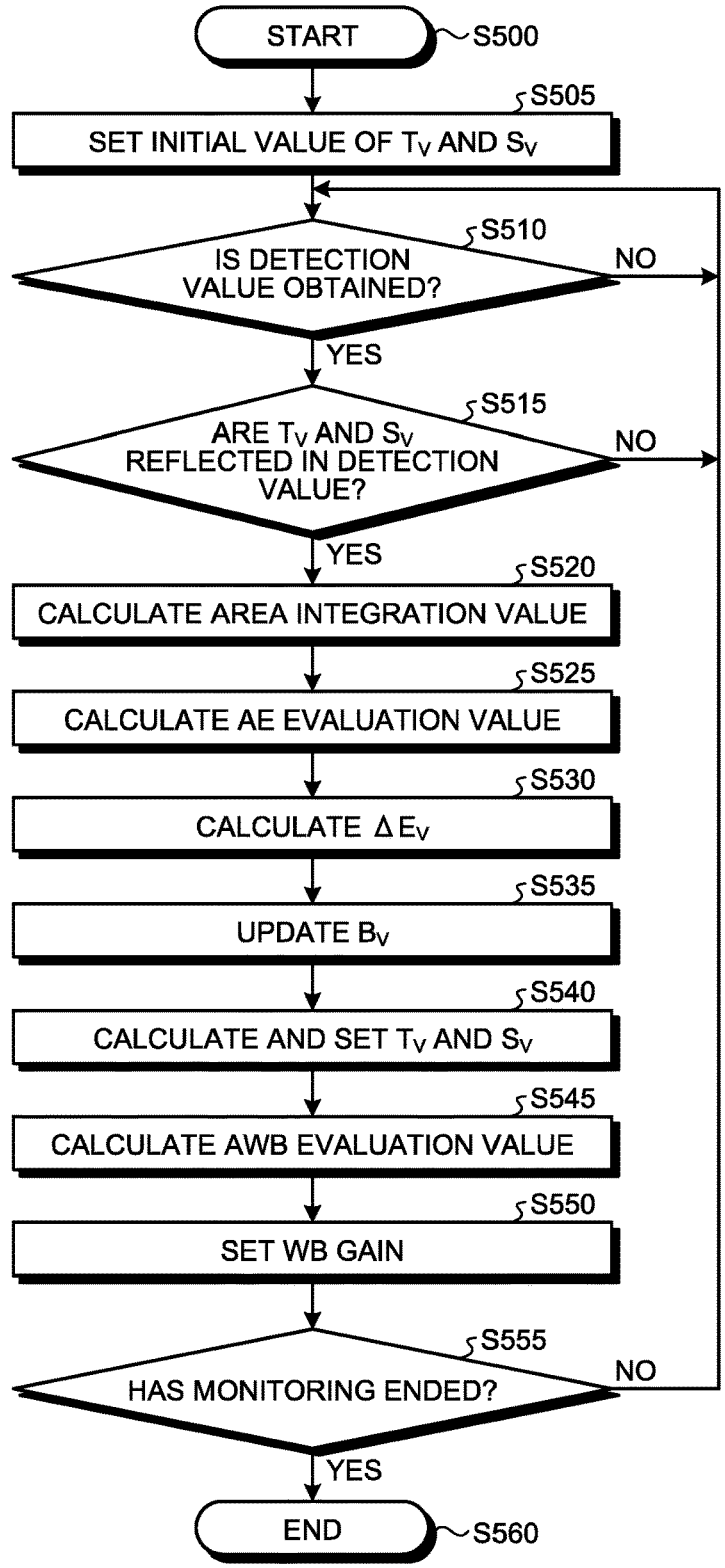
FIG. 5 is a flowchart for explaining a flow of operations performed at the time of pre-imaging monitoring.

Regarding the details of the operations performed by the function units of a camera, the explanation is given below with reference to a flowchart illustrated in FIG. 5. Thus, FIG. 5 is a flowchart for explaining a flow of a series of AE operations performed at the time of pre-imaging monitoring. The AE operations are started at Step 500. At Step 505, the initial values of the shutter speed and the ISO sensitivity are set in the sensors A and B. Herein, common values are set in the sensors A and B. For example, the simple AE processing function can be used to set the values in such a way that the correct exposure is achieved. Meanwhile, the set values have the Apex format in which values having different unit systems can be treated as having the same scale. With that, it becomes possible to perform calculations such as addition and subtraction.

The calculating unit 101 calculates a photographic subject brightness value By and an exposure value Ev representing photometric values. For that calculation, shutter speed Tv and ISO sensitivity Sv are used, and the calculation is performed using Equation (1) given below. In Equation (1), Av represents the aperture value and, in this example, is a fixed value because the omnidirectional imaging camera 10 is used as a camera not having an aperture. Moreover, 0x50 represents a reference value of the ISO sensitivity Sv and, for example, is assumed to be the value for the IS sensitivity ISO100. Meanwhile, each of Bv, Ev, Av, 0x50 is a value in the Apex format.

$$B_v = E_v = T_v + A_v - (S_v - 0x50) \tag{1}$$

At Step 510, the acquisition of a detection value, which represents RAW-RGB data of an image, by the camera is awaited. Thus, until a detection value is detected, the determination at Step 510 is performed in a repeated manner. Herein, the detection value is obtained for each frame. At Step 515, it is determined whether or not the shutter speed Tv and the ISO sensitivity Sv are reflected in the detection value. If the shutter speed Tv and the ISO sensitivity Sv are not reflected in the detection value, then the system control returns to Step 510 and the acquisition of a detection value is again awaited and a detection value is obtained. Herein, whether or not the shutter speed Tv and the ISO sensitivity Sv are reflected in the detection value can be determined depending on whether or not the exposure condition of each sensor has smaller variation and has become stable. If it is determined that the shutter speed Tv and the ISO sensitivity Sv are reflected in the detection value, then the system control proceeds to Step 520. As a result of determining whether or not the shutter speed Tv and the ISO sensitivity Sv are reflected in the detection value, the operation of calculating the area integration value (described later) need not be repeatedly performed until it is determined that the shutter speed Tv and the ISO sensitivity Sv are reflected in the detection value. That enables achieving reduction in the calculation load.

Figures 6, 7:
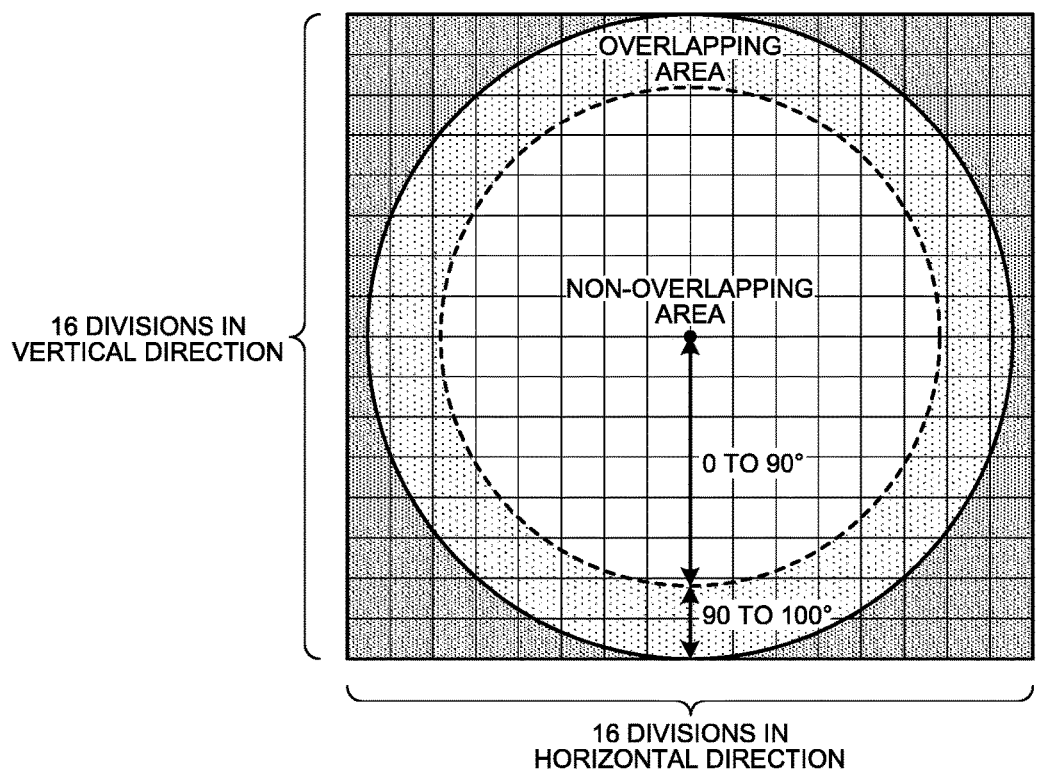
FIG. 6 is a diagram illustrating division of an image into a plurality of blocks.
FIG. 7 is a diagram illustrating an AE table.

At Step 520, the calculating unit 101 calculates the area integration value for each of the sensors A and B from the obtained detection value. The area integration value can be calculated in the following manner. Firstly, RAW-RGB data of a fisheye image illustrated in FIG. 6 is equally divided into blocks representing a plurality of areas that are 16 in number in the horizontal direction and 16 in number in the vertical direction. In order to divide data into a plurality of areas, the calculating unit 101 can include an area dividing unit. Meanwhile, the RAW-RGB data includes RGB values as the pixel values of pixels constituting the image. Subsequently, for each block obtained by division, the RGB values are integrated. Then, for each block, a brightness value (Y value) is obtained using Equation (2) given below, and the Y value is treated as the area integration value. In Equation (2), R represents the R value in the RGB values, G represents the G value in the RGB values, and B represents the B value in the RGB values.

$$Y = R \times 0.299 + G \times 0.587 + B \times 0.114 \tag{2}$$

Herein, although the number of blocks obtained by division is assumed to be 16×16=256, it is not the only possible case. That is, smaller the number of divisions, smaller is the amount of calculations and greater is the achievable reduction in the calculation period. Hence, it is desirable to have a smaller number of divisions. However, if the number of divisions is too small, the calculation accuracy undergoes a decline. Hence, in the case of dividing into a count n×n where n is a natural number, it is assumed that n is equal to or greater than four. Moreover, although it is not always necessary to have equal division such as n×n, that is the desirable pattern because all blocks obtained by division have the equal dimensions and the same shape.

The area integration value is calculated using the blocks obtained by equal division of the taken image. For example, if the taken image has approximately ten million pixels, each block happens to include approximately 1000/256=approximately 39000 pixels. Each pixel holds the information about the R, G, and B components of the corresponding photographic subject portion, and the information is recorded and used as, for example, 12-bit information (0 to 255). Thus each block holds the information about approximately 39000 R components, approximately 39000 G components, and approximately 39000 B components. In each block, the information about approximately 39000 R components, approximately 39000 G components, and approximately 39000 B components is integrated for the R components, the G components, as well as the B components; and the area integration value is calculated.

Meanwhile, in the CMOS used in this example, the ratio of R, G, and B pixels is R:G:B=1:2:1. Hence, in each block, there are approximately 9750 R pixels, approximately 19500 G pixels, and approximately 9750 B pixels.

Returning to the explanation with reference to FIG. 5, at Step 525, the evaluation value calculating unit of the calculating unit 101 divides the area integration value by the number of integrated RGB values (the integration count) and calculates the AE evaluation value. The AE evaluation value implies the exposure evaluation value for evaluating the exposure of the imaging element and is used in exposure calculation performed at a later stage.

At Step 530, such AE evaluation values in the sensor A and B which are equal to or smaller than a certain value are averaged, and the difference (ΔEv) with the correct exposure is calculated based on an AE table. The criterion of equal to or smaller than a certain value is set so that the AE evaluation values having an error are not used at the time of calculating the average.

As illustrated in FIG. 7, the AE table is meant for indicating the difference (ΔEv) with the correct exposure corresponding to the AE evaluation values. For example, if the AE evaluation value obtained by averaging as explained above is equal to 920, then the difference ΔEv of ±1 is obtained from the AE table. This difference ΔEv of ±1 indicates the brightness of 1 Ev with reference to the correct exposure. Meanwhile, when the AE evaluation value is in between two values specified in the AE table, the difference ΔEv is calculated according to linear interpolation.

Meanwhile, if the AE evaluation value is either smaller than 58 or greater than 3680, then the difference ΔEv is clipped either to the minimum value of −3 or to the maximum value of +3 in the AE table. Hence, regardless of whether the AE evaluation value is 50 or 25, the difference ΔEv is calculated as −3. Moreover, regardless of whether the AE evaluation value is 3681 or 5000, the difference ΔEv is calculated as +3.

In that regard, in the present embodiment, at Step 520 explained earlier, in the RAW-RGB data of the fisheye image illustrated in FIG. 6, of the circular inside portion in which the light is not blocked, the pixel values of the pixels constituting only the non-overlapping area excluding the overlapping area (i.e., when the center of the circle is set as 0°, the area from 0° to 90°) are used in calculating the area integration value. That is, for example, when the angle of view of the fisheye lenses is 220°, as illustrated in FIG. 6, of the RAW-RGB data of the fisheye image, the pixel values of the pixels constituting the overlapping area (i.e., when the center of the circle is set as 0°, the area from 0° to 90°) are not used in calculating the area integration value (the brightness value). That is because, if the area integration value (the brightness value) is calculated based on the pixel values of the pixels constituting the overlapping area, the following issues arise.

For example, assume that a photographic subject of high brightness (for example, the sun) is present in the shooting range in which the angle of view of the fisheye lens 21 and the angle of view of the fisheye lens 22 overlap with each other. In that case, regarding the RAW-RGB data corresponding to each of the sensors A and B, if the area integration value (the brightness value) is calculated using the pixel values of the pixels constituting the overlapping area, then the AE evaluation value of the sensor A and the AE evaluation value of the sensor B, which are calculated at Step 525, become greater due to the effect of the photographic subject of high brightness. As a result, the average value of the two AE evaluation values no more correctly reflects the actual brightness of the photographic subject.

In an identical manner, assume that a photographic subject of low brightness (for example, a shadow) is present in the shooting range in which the angle of view of the fisheye lens 21 and the angle of view of the fisheye lens 22 overlap with each other. In that case, regarding the RAW-RGB data corresponding to each of the sensors A and B, if the data of the overlapping area is included in the area integration value, then the AE evaluation value of the sensor A and the AE evaluation value of the sensor B, which are calculated at Step 525, become smaller due to the effect of the photographic subject of low brightness. As a result, the average value of the two AE evaluation values no more correctly reflects the actual brightness of the photographic subject.

Regarding that issue, in the present embodiment, in the RAW-RGB data of the fisheye image illustrated in FIG. 6, of the circular inside portion in which the light is not blocked, the pixel values of the pixels constituting the overlapping area are not used in calculating the area integration value (the brightness value); and the area integration value is calculated based on the pixel values of the pixels constituting only the non-overlapping area. As a result, exposure control can be performed in a stable manner without getting affected by the photographic subject present in the overlapping shooting range of the fisheye lens 21 and the fisheye lens 22.

Returning to the explanation with reference to FIG. 5, at Step 535, the photometric value adjusting unit adds the difference ΔEv to the photographic subject brightness value Bv calculated in the previous instance, and updates the photographic subject brightness value Bv. Based on the photographic subject brightness value Bv that has been updated, the calculating unit 101 calculates the exposure value using Equation (1) given earlier. For example, when the difference ΔEv is equal to zero, it is determined that the correct exposure is achieved. Thus, such an exposure value Ev is calculated at which the difference ΔEv becomes equal to zero. At Step 540, using the calculated exposure value Ev, the exposure conditions such as the shutter speed Tv and the ISO sensitivity Sv are calculated according to a program chart illustrated in FIG. 8, for example. Subsequently, the correcting unit 103 performs correction, and then the setting unit 104 sets the post-correction shutter speed Tv and the post-correction ISO sensitivity Sv in the sensors A and B.

At Step 545, the evaluation value calculating unit of the calculating unit 101 divides the area integration value, which is calculated at Step 520, by the number of integrated RGB values (the integration count) and calculates AWB evaluation values (G/R and G/B) using Equations (3) and (4) given below. The AWB evaluation values represent white balance evaluation values for evaluating the white balance of the imaging element, and are used in the WB gain operation (the white balance operation) performed at a later stage.

$$G/R = (\text{area integration value } (G)/\text{integration count } (G)))/(\text{area integration value } (R)/\text{integration count } (R)) \quad (3)$$

$$G/B = (\text{area integration value } (G)/\text{integration count } (G)))/(\text{area integration value } (B)/\text{integration count } (B)) \quad (4)$$

Figures 10, 11:
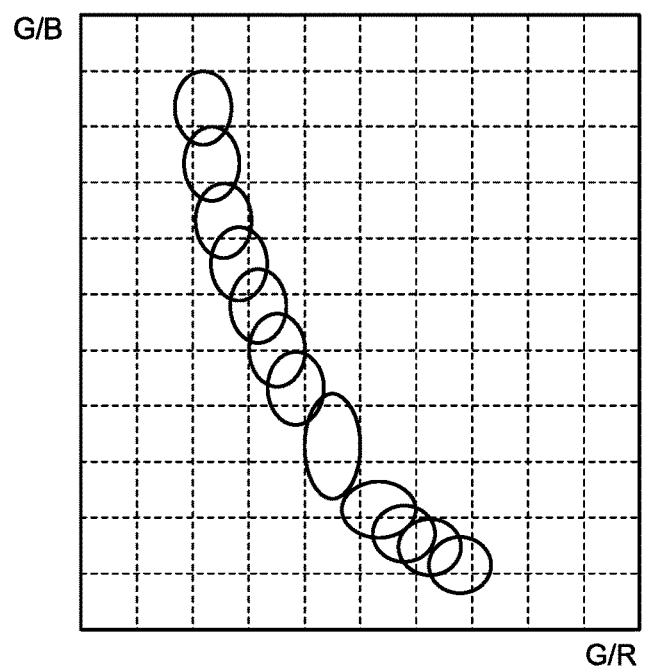
FIG. 10 is a diagram illustrating correction information that is referred to during the operations illustrated in FIG. 9.
FIG. 11 is a diagram illustrating a white extraction range that is referred to during a WB gain operation.

In the WB gain operation, based on the AWB evaluation values (G/R and G/B), the pixels in an internal white extraction range are averaged in advance and set as the white balance gain (Rgain and Bgain). As illustrated in FIG. 11, the white extraction range represents two-dimensional color coordinates with G/R representing the x-axis and G/B representing the y-axis.

At Step 550, the calculated Rgain and Bgain are set as setting values in the WB gain operation of the ISPs ISP2-A and ISP2-B illustrated in FIG. 3.

In the present embodiment, in the RAW-RGB data of the fisheye image illustrated in FIG. 6, the area integration value (the brightness value), which is calculated based on the pixel values of the pixels constituting only the non-overlapping area and without using the pixel values of the pixels constituting the overlapping area of the circular inside portion in which the light is not blocked, is used in calculating the AWB evaluation values (G/R and G/B). As a result, the white balance operation can be performed in a stable manner without getting affected by the photographic subject present in the overlapping shooting range of the fisheye lens 21 and the fisheye lens 22.

At Step 555, it is determined whether or not the monitoring has ended. During the monitoring, the shutter is opened before the imaging and the light is made to fall on the imaging element. Hence, either when the imaging starts or when the power supply to the camera is turned OFF, it marks the end of the monitoring. If the monitoring has not ended, then the system control returns to Step 510, and the operations from Step 510 to Step 550 are repeated. When the monitoring ends, the system control proceeds to Step 560 and it marks the end of the operations.

At the time of monitoring, the shutter speed Tv and the ISO sensitivity Sv are repeatedly calculated and set as the setting values; and the setting values are adjusted so as to achieve the correct exposure.

Figure 8:
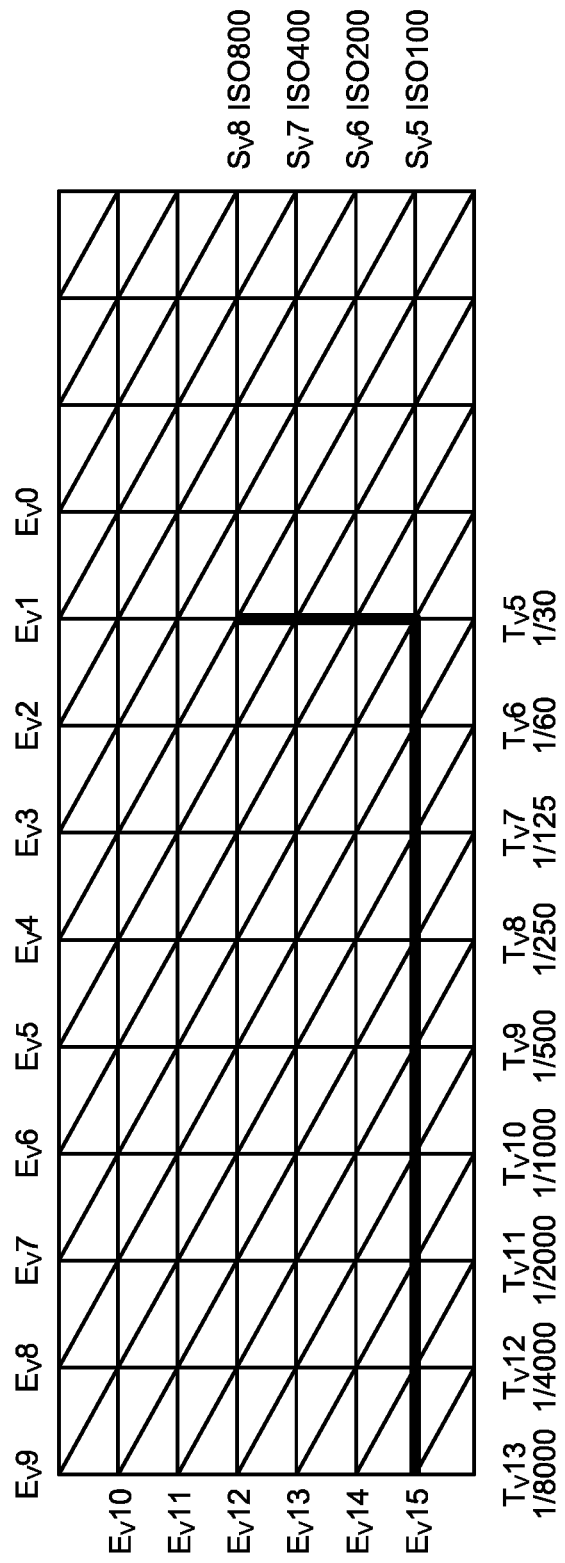
FIG. 8 is a diagram illustrating a program chart.

At Step 540, for example, assume that the exposure value Ev is equal to nine. Then, in the program chart illustrated in FIG. 8, shutter speed Tv7 and ISO sensitivity Sv5 that are present at the point at which the inclined line from exposure value Ev9 intersects with the heavy line are calculated as the shutter speed Tv and the ISO sensitivity Sv. In FIG. 8, the numerical values such as 9, 7, 5, and so on written beside Ev, Tv, and Sv are values expressed in the Apex format. Moreover, the fractions written below Tv represent the values of the original shutter speeds not expressed in the Apex format. Furthermore, the numerical values written on the right-hand side of Sv represent the values of the original ISO sensitivities not expressed in the Apex format.

Figure 9:
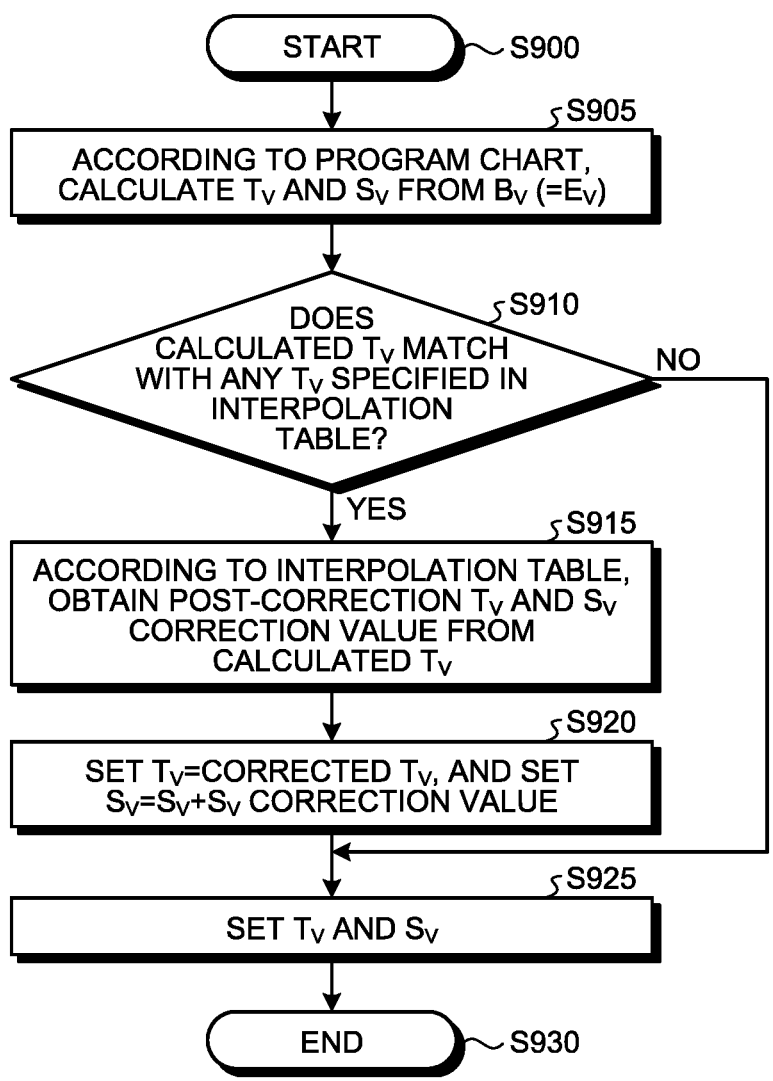
FIG. 9 is a flowchart for explaining a flow of operations for calculating the shutter speed and the ISO sensitivity.

Regarding the calculation and setting of the shutter speed Tv and the ISO sensitivity Sv, the detailed explanation is given with reference to a flowchart illustrated in FIG. 9. The operations are started at Step 900. At Step 905, the calculating unit 101 calculates the shutter speed Tv and the ISO sensitivity Sv from the photographic subject brightness value Bv, which has been updated at Step 535, according to the program chart illustrated in FIG. 8. Since the calculation method is described earlier, the same explanation is not given again.

At Step 910, the correcting unit 103 determines whether or not the calculated shutter speed Tv matches with any of the shutter speeds Tv specified in the interpolation table representing correction information. An example of the interpolation table is illustrated in FIG. 10. The interpolation table includes an entry field and an output field. In the entry field, the pre-correction shutter speeds Tv are set. In the output field, the post-correction shutter speeds Tv and corresponding Sv correction values are set. Thus, the interpolation table is a correspondence table in which the abovementioned values are held in a corresponding manner. Regarding the values, it is possible to set the most suitable values that are obtained by conducting tests in advance.

In the pre-correction shutter speeds Tv; for example, such predetermined values are set which are on the high-speed side of the shutter speeds that need to be corrected. With reference to FIG. 10, it is assumed that the camera has resolution of 1/16, and predetermined values are set in the case in which 0x10, 0x20, 0x30, . . . , 0xC0, and so on are treated as the shutter speeds of ½, ¼, ⅛, . . . , ¼000, and so on. Meanwhile, in the entry field, 0xBF corresponds to ⅓900.

For example, when the calculated shutter speed Tv is 0xBF, it is corrected to 0xC0 and the calculated ISO sensitivity Sv is corrected to +1 according to the interpolation table. Herein, +1 implies the following: if the calculated ISO sensitivity Sv is ISO100, it is corrected to the ISO sensitivity of ISO104 that is 1/16 notches higher; and, if the calculated ISO sensitivity Sv is ISO200, it is corrected to the ISO sensitivity of ISO208 that is 1/16 notches higher. Thus, in the case of correction to +2, if the calculated ISO sensitivity Sv is ISO100, it is corrected to the ISP sensitivity of ISO109 that is 2/16 notches higher.

In the example given above, if the calculated shutter speed Tv is 0xBF, it is changed to 0xC0. As a result, the shutter speed becomes faster, and the brightness of the photographic subject decreases thereby making the photographic subject darker. Thus, the corresponding ISO sensitivity Sv is corrected to +1 to enhance the sensitivity and to increase the brightness of the photographic subject, so that the photographic subjected is adjusted to have the correct brightness.

Since the camera has the resolution of 1/16, the value of the shutter speed Tv calculated at Step 905 is obtained as 0xB1 or 0xB9 that is not necessarily always settable as the shutter speed. For example, the value can be between ½900 seconds (0xB7) and ¼000 seconds (0xC0) that are settable as the shutter speed. Since a value between those values cannot be set, such a value cannot be used. Such shutter speeds which cannot be used are set in the interpolation table and are subjected to correction, so that it becomes possible to implement minute exposure control. Herein, although the explanation is given for an example of using the interpolation table, that is not the only possible case. Alternatively, a conversion equation expressing the relationship between pre-correction shutter speeds Tv and post-correction shutter speeds Tv can be used in obtaining a post-correction shutter speed Tv.

At Step 910, if the calculated shutter speed Tv matches with any of the shutter speeds Tv specified in the interpolation table, then the system control proceeds to Step 915 and the post-correction shutter speed Tv and the Sv correction value are obtained from the calculated shutter speed Tv according to the interpolation table. At Step 920, the calculated shutter speed Tv and the calculated ISO sensitivity Sv are corrected using the obtained shutter speed Tv and the obtained Sv correction value. When the correction is ended or, at Step 910, if the calculated shutter speed Tv matches with none of the shutter speeds Tv specified in the interpolation table; the system control proceeds to Step 925.

At Step 925, either the shutter speed Sv and the ISO sensitivity Tv obtained by correction or the calculated shutter speed Sv and the calculated ISO sensitivity Tv are set as the setting values in the sensors A and B. At Step 930, the operations are ended. Thus, at the time of taking images of the photographic subject, the camera uses the shutter speed Sv and the ISO sensitivity Tv that are set.

At the time of taking images of the photographic subject, in order to achieve the more correct exposure, the gamma value used in the abovementioned gamma correction can be adjusted or the gain value used in the abovementioned white balance operation can be adjusted so as to adjust the brightness information of the images.

Although the present invention is described above in the form of an embodiment of a control system, an imaging device, and a control method; the present invention is not limited to the embodiment described above. That is, the present invention is to be construed as embodying all modifications such as other embodiments, additions, alternative constructions, and deletions that may occur to one skilled in the art that fairly fall within the basic teaching herein set forth. In any form thereof, as long as the functions/effects of the present invention are achieved, the modifications are included in the scope of the present invention. Thus, in the present invention, a program for making a computer implement the control method can be provided; or a recording medium in which the program is recorded can be provided; or a server device that provides the program via a network can be provided.

According to an embodiment, exposure control can be performed with accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST 10 omnidirectional imaging camera
11, 12 lens window
13 imaging SW
20 camera cone unit
21, 22 image forming optical system (fisheye lens)
23, 24 imaging element
30 processor
31 CPU
32 NAND FLASH
33 SW
34 RAM
35 SDRAM
36 triaxial accelerometer
37 memory card slot
38 USB connector
39 wireless network interface
40, 41 ISP
42 distortion correction/synthesizing operation unit
43 face detecting unit
44 MEMC
45 ARB MEMC
46 DMAC
47 IP block
48 image data transferring unit
49 SDRAMC
50 bridge
51 memory card control block
52 USB block
53 serial block SPI
54 JPEGCODEC block
55 H.264 codec block
56 RESIZE block
57 peripheral block
58 power supply controller
59 voice recording/reproducing unit
60 microphone
61 speaker
62 LCD driver
63 LCD monitor
100 control system
101 calculating unit
102 memory unit
103 correcting unit
104 setting unit

What is claimed is:

1. A control system to control an imaging device to generate an omnidirectional image based on a first image obtained using a first fisheye lens and a second image obtained using a second fisheye lens, the control system comprising:
an evaluation value calculating circuitry configured to:
calculate a brightness value of the first image based on pixel values of pixels constituting the first image,
calculate, based on the brightness value, a first exposure evaluation value for evaluating exposure of a first imaging element corresponding to the first fisheye lens,
calculate a brightness value of the second image based on pixel values of pixels constituting the second image, and
calculate, based on the brightness value, a second exposure evaluation value for evaluating exposure of a second imaging element corresponding to the second fisheye lens, wherein
the evaluation value calculating circuitry is configured to not use pixel values of pixels constituting an overlapping area in which there is overlapping of a shooting range of the first image and a shooting range of the second image, during calculation of the brightness value of the first image and calculation of the brightness value of the second image.

2. The control system according to claim 1, further comprising:
a photometric value calculating circuitry configured to, based on a setting value set in the imaging device, calculate a photometric value indicating brightness of a photographic subject;
a photometric value adjusting circuitry configured to, based on the first exposure evaluation value and the second exposure evaluation value calculated by the evaluation value calculating circuitry, adjust the photometric value calculated by the photometric value calculating circuitry;
an exposure value calculating circuitry configured to calculate, from the calculated photometric value, an exposure value indicating a degree of exposure of the first imaging element and the second imaging element to light; and a setting value calculating circuitry configured to calculate, as setting values, an exposure period for which an imaging element is to be exposed to light and a sensitivity value indicating sensitivity to light of the imaging element, the exposure period and the sensitivity value corresponding to the calculated exposure value.

3. The control system according to claim 1, wherein the evaluation value calculating circuitry is configured to:
calculate a first white balance evaluation value for evaluating white balance of the first imaging element based on the brightness value of the first image; and
calculate a second white balance evaluation value for evaluating white balance of the second imaging element based on the brightness value of the second image.

4. The control system according to claim 1, wherein
the first fisheye lens and the second fisheye lens are placed opposite to each other with respective optical axes set to be coincident, and
an angle of view of each of the first fisheye lens and the second fisheye lens exceeds 180°.

5. An imaging device comprising the control system according to claim 1.

6. A non-transitory computer-readable medium including programmed instructions that cause a computer, which controls an imaging device to generate an omnidirectional image based on a first image obtained using a first fisheye lens and a second image obtained using a second fisheye lens, to execute:
calculating a brightness value of the first image based on pixel values of pixels constituting the first image;
calculating, based on the brightness value, a first exposure evaluation value for evaluating exposure of a first imaging element corresponding to the first fisheye lens;
calculating a brightness value of the second image based on pixel values of pixels constituting the second image; and
calculating, based on the brightness value, a second exposure evaluation value for evaluating exposure of a second imaging element corresponding to the second fisheye lens, wherein
in the calculating the brightness value, pixel values of pixels constituting an overlapping area in which there is overlapping of a shooting range of the first image and a shooting range of the second image, are not used.

7. The non-transitory computer-readable medium according to claim 6, wherein the programmed instructions further cause the computer to execute:
calculating, based on a setting value set in the imaging device, a photometric value indicating brightness of a photographic subject;
adjusting, based on the calculated first exposure evaluation value and the calculated second exposure evaluation value, the calculated photometric value;
calculating, from the calculated photometric value, an exposure value indicating a degree of exposure of the first imaging element and the second imaging element to light; and
calculating, as setting values, an exposure period for which an imaging element is to be exposed to light and a sensitivity value indicating sensitivity to light of the imaging element, the exposure period and the sensitivity value corresponding to the calculated exposure value.

8. The non-transitory computer-readable medium according to claim 6, wherein the programmed instructions further cause the computer to execute:
calculating a first white balance evaluation value for evaluating white balance of the first imaging element based on the brightness value of the first image; and
calculating a second white balance evaluation value for evaluating white balance of the second imaging element based on the brightness value of the second image.

* * * * *